(12) United States Patent
Kornbluh

(10) Patent No.: US 8,471,699 B2
(45) Date of Patent: Jun. 25, 2013

(54) METHOD FOR MONITORING THE SAFETY OF TRAVELERS

(75) Inventor: Dennis C Kornbluh, Lincoln, NE (US)

(73) Assignee: Avaya, Inc., Basking Ridge, NJ (US)

( * ) Notice: Subject to any disclaimer, the term of this patent is extended or adjusted under 35 U.S.C. 154(b) by 971 days.

(21) Appl. No.: 12/509,117

(22) Filed: Jul. 24, 2009

(65) Prior Publication Data

US 2011/0018709 A1    Jan. 27, 2011

(51) Int. Cl.
*G08B 1/08* (2006.01)

(52) U.S. Cl.
USPC .............. 340/539.13; 340/815.4; 340/815.42; 340/815.75; 340/332

(58) Field of Classification Search
USPC ................ 340/815.4, 815.42, 815.75, 539.1, 340/332
See application file for complete search history.

(56) References Cited

U.S. PATENT DOCUMENTS

| | | | |
|---|---|---|---|
| 5,742,666 A | 4/1998 | Alpert | |
| 6,147,644 A * | 11/2000 | Castles et al. | 342/367 |
| 7,046,140 B2 | 5/2006 | Adamczyk et al. | |
| 7,068,163 B2 * | 6/2006 | Sari et al. | 340/539.13 |
| 7,076,235 B2 | 7/2006 | Esque et al. | |
| 7,212,111 B2 | 5/2007 | Tupler et | |
| 8,060,283 B2 * | 11/2011 | Mott et al. | 701/50 |
| 2005/0197096 A1 | 9/2005 | Yang et al. | |
| 2008/0147461 A1* | 6/2008 | Lee et al. | 705/7 |
| 2011/0184686 A1* | 7/2011 | Brooks et al. | 702/99 |

OTHER PUBLICATIONS

"Your Social Compass", "http://www.loopt.com/", 2009, Publisher: Loopt, Inc.
"Spot Functions: Check in", "http://www.findmespot.com/en/index.php?cid=1112", 2009, Publisher: SPOT.
"Whrrl—What's your story?", "http://whrrl.com/", 2009, Publisher: Pelago, Inc.

* cited by examiner

*Primary Examiner* — Daryl Pope (57) ABSTRACT

A method is provided for monitoring the present location of a traveler at time $t_1$, predicting a location at which the traveler is expected to arrive by time $t_2$, and verifying the safety of the traveler. The safety verification is conducted if the traveler has not reached the expected location at time $t_2$, if signal from the traveler is lost or if a message from the traveler is not received within a predetermined time period. In some embodiments of the present invention, verifying the safety of the traveler involves contacting the traveler at one or more telecommunications devices which the traveler is known to carry, contacting another person that is known to be accompanying the traveler, and if all else fails—alerting the local emergency response team.

22 Claims, 6 Drawing Sheets

METHOD FOR MONITORING THE SAFETY OF TRAVELERS

FIELD OF THE INVENTION

The present invention relates to telecommunications in general, and, more particularly, to a technique for reliably monitoring the safety of a person or object.

BACKGROUND OF THE INVENTION

When individuals travel, they often find themselves in risky or dangerous situations. Every year hikers are attacked by bears, become lost, or are injured. When dangerous circumstances arise, there is a need to guarantee that emergency response actions are promptly initiated and help is delivered in a timely manner. For this reason, hikers have adopted a variety of practices and technologies that allow emergency crews to respond promptly when the hikers become endangered.

A common method used by hikers is to manually register in written logbooks at trailheads before entering wilderness areas. In a dangerous situation, such as a sudden storm, emergency response personnel can refer to the logbooks and determine who is in the zone of danger. This approach, however, has limited efficacy because the logbooks only inform of the presence of hikers inside a particular wilderness area. Moreover, such presence information is unreliable because it is impossible to guarantee that the all hikers who entered the wilderness area have diligently registered their names.

Another approach adopted by hikers is to carry electronic communication devices that allow the hikers to send emergency alerts to a centralized safety system. This approach, however, does not provide a guarantee that emergency response personnel will be alerted at all times when this is necessary. In particular, the approach fails when the electronic communication devices fall out of range, lose power, or are lost. If the electronic communication device of a hiker is lost, the centralized safety system will not detect that the hiker is left without means to send an emergency alert. Similarly, if the hiker is rendered unconscious or disabled before having the opportunity to send an emergency alert, the centralized safety system will not be appraised that the hiker is facing danger.

Therefore a need exists for a reliable system by which travelers can obtain a guarantee that timely and appropriate emergency response actions will be initiated if their safety is threatened.

SUMMARY OF THE INVENTION

The present invention answers this need by providing a method for the monitoring of the safety of travelers.

The present invention comprises monitoring the present location of a traveler at time $t_1$, predicting a location at which the traveler is expected to arrive by time $t_2$, and verifying the safety of the traveler. The safety verification is conducted if the traveler has not reached the expected location at time $t_2$, if signal from the traveler is lost or if a message from the traveler is not received within a predetermined time period. In some embodiments of the present invention, verifying the safety of the traveler involves contacting the traveler at one or more telecommunications devices which the traveler is known to carry, contacting another person that is known to be accompanying the traveler, and if all else fails—alerting the local emergency response team.

The present invention is effective even in situations where the traveler loses, breaks or otherwise renders unusable his telecommunications device. In accordance with the present invention, if communication with the traveler is lost, a travelling companion of the traveler will be contacted to ensure the traveler's safety. Furthermore, if the traveler is rendered unconscious and unable to use his or her telecommunications device, the present invention will detect that the traveler failed to arrive at the predicted location by time $t_2$ and raise an alarm. And still furthermore, the present invention ensures that a traveling log for the traveler is diligently maintained by requiring the traveler to contact and record messages at a centralized server. In the event of an emergency, the recorded messages have the potential to provide information that is useful in locating and aiding the traveler.

Although some embodiments of the present invention are described in the context of hiking, it is to be understood that the uses and applications of the methods and principles described in this disclosure extend well beyond monitoring the safety of hikers to virtually all fields in which the automated monitoring of the safety of travelers is desirable.

DETAILED DESCRIPTION

Figure 1:
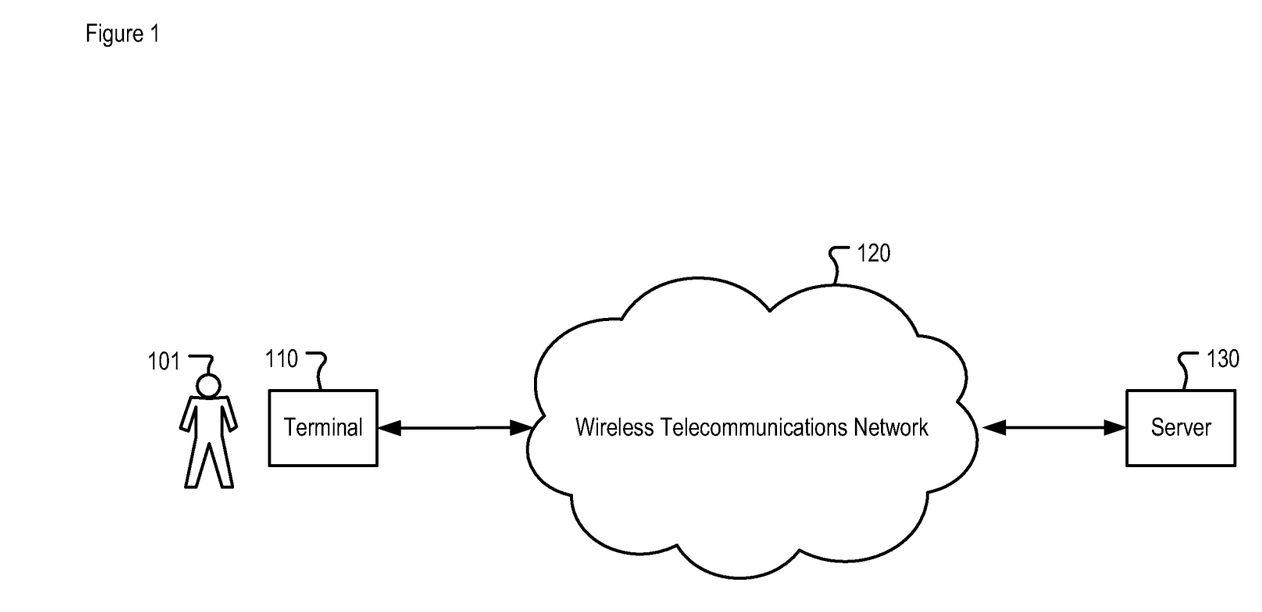
FIG. 1 depicts a schematic diagram of the salient components of the illustrative embodiment of the present invention.

FIG. 1 depicts a schematic diagram of the salient components of the illustrative embodiment of the present invention. The illustrative embodiment comprises user 101, terminal 110, telecommunications network 120, and server 130.

User 101 is a traveler using telecommunications terminal 110.

Terminal 110 is a cellular telephone operating over telecommunications network 120. In accordance with the illustrative embodiment, terminal 110 is a cellular telephone, but it will be clear to those skilled in the art, after reading this disclosure, how to make and use alternative embodiments of the present invention in which terminal 110 is any other telecommunications device (e.g. portable digital assistant, 2-way radio, personal computer, GPS transceiver, tracking device, etc.).

Server 130 is hardware and software for monitoring the safety of user 101. Server 130 comprises processor, memory, network adapter, and radio transceiver. In accordance with the illustrative embodiment of the present invention, server 130 is capable of receiving and processing geo-locational signals and maintaining a profile for user 101.

Telecommunications network 120 transports signals between terminal 110 and server 130. In accordance with the illustrative embodiment of the present invention, telecommunications network 120 is a cellular telephone network, but it will be clear to those skilled in the art, after reading this disclosure, how to make and use alternative embodiments of the present invention in which telecommunications network 120 is another telecommunications network, such as, for example, and without limitation, the Internet, SONET, 802.11 wireless network, etc. In accordance with the illustrative embodiment of the present invention, server 130 connects with terminal 110 through a switched network, but those skilled in the art will appreciate, after reading this disclosure, that alternative embodiments of the present invention can be devised in which server 130 and terminal 110 communicate with each other directly without the use of switching services.

Figure 2:
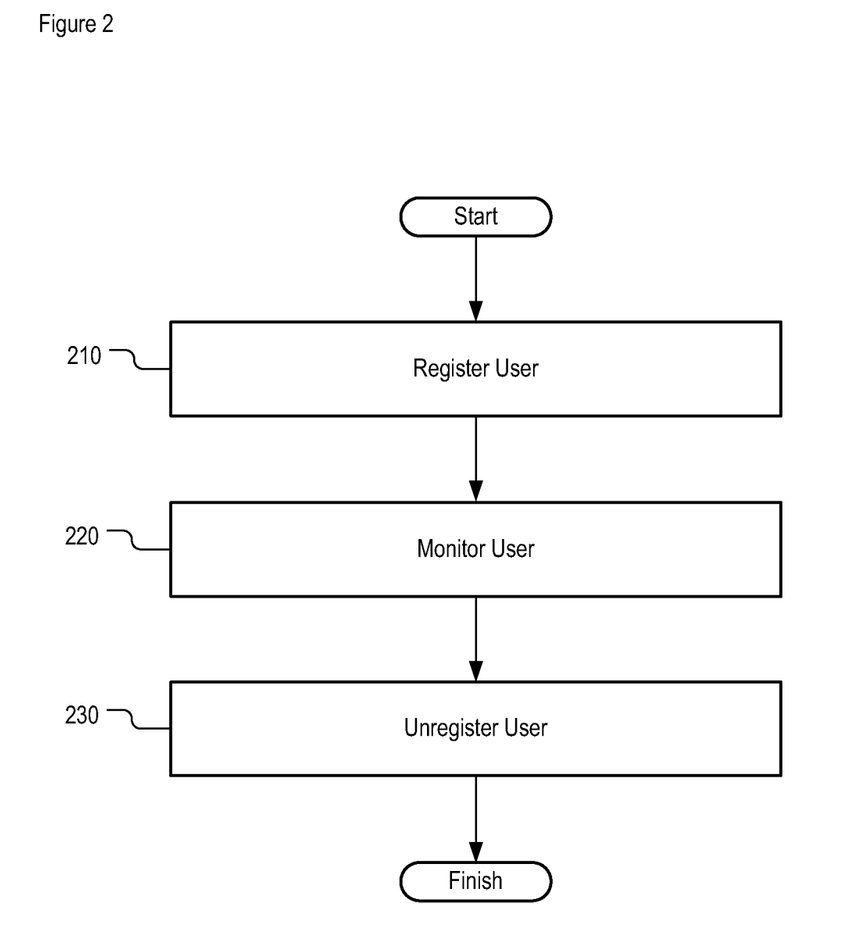
FIG. 2 depicts a flowchart of the salient tasks associated with the operation of the illustrative embodiment.

FIG. 2 depicts a flowchart of the salient tasks associated with the operation of the illustrative embodiment. It will be clear to those skilled in the art, after reading this disclosure, how to perform the tasks associated with FIG. 2 in a different order than represented or to perform one or more of the tasks concurrently. Furthermore, it will be clear to those skilled in the art, after reading this disclosure, how to make and use alternative embodiments of the present invention that omit one or more of the tasks.

At task 210, user 101 registers with server 130 and submits information that is used for the creation of a user profile. In accordance with the illustrative embodiment of the present invention, the personal information of user 101 comprises an identification of terminal 110. This information allows server 130 to associate user 101 with terminal 110 and use the location of terminal 110 as a proxy for the location of user 101. In accordance with the illustrative embodiment, the user profile also comprises an identification of a traveling companion of the user and one or more telecommunications devices associated with the traveling companion. However, those skilled in the art will readily appreciate that in situations in which user 101 is traveling alone, traveling companion information will not be present in the user profile. Those skilled in the art will further appreciate, after reading this disclosure, that that the user profile can contain any type of information concerning user 101, such as, for example, and without limitation:

i. travel route; or
ii. a map of a geographic location through which the user is going to travel; or
iii. travel iterniary; or
iv. identities of traveling companions; or
v. emergency contact information; or
vi. identification of one or more telecommunications terminals associated with the user's travelling companions; or
vii. amount of supplies which the user carries; or
viii. photographs of the user; or
ix. photographs of the traveling parties; or
x. information about the supplies with which the user plans to travel; or
xi. information about equipment in which the user will be in possession during his or her trip (e.g. type clothes, type of boots, type of tent, type of sleeping bag, type of vehicle, type of firearms, etc.); or
xii. any combination of i, ii, iii, iv, v, vi, vii, viii, ix, x, and xi.

In accordance with the illustrative embodiment, user 101 submits his or her personal information through the Internet via a web service provided by server 130, but it will be clear to those skilled in the art, after reading this disclosure, how to make and use alternative embodiments of the present invention in which the personal information of user 101 is submitted to server 130 via alternative means, such as, for example, and without limitation, by calling a live operator, sending a text message from a cellular phone, by using an interactive voice response (IVR) system, mail, email, etc. Task 210 is further described in the discussion with respect to FIG. 3.

At task 220, server 130 monitors the safety of user 101. Task 220 is further described in the discussion with respect to FIG. 4.

At task 230, user 101 is unregistered from server 130 and the server stops monitoring the safety of the user. In accordance with the illustrative embodiment, all information concerning user 101 is removed from server 130, but it will be clear to those skilled in the art, after reading this disclosure, how to make and use alternative embodiments of the present invention in which server 130 continues to maintain the user profile after task 230 is executed.

Figure 3:
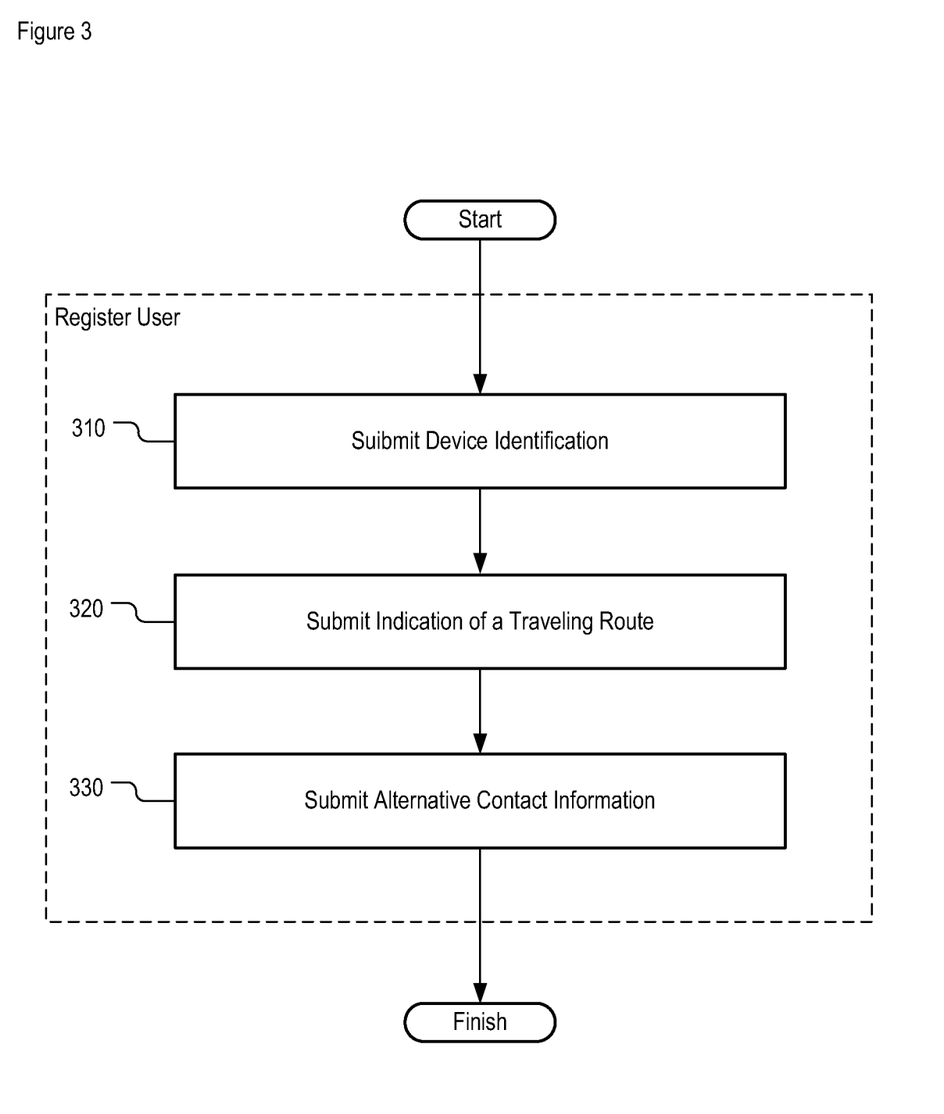
FIG. 3 depicts a flowchart of the salient subtasks associated with the execution of task 210.

FIG. 3 depicts a flowchart of the salient subtasks associated with the execution of task 210. It will be clear to those skilled in the art, after reading this disclosure, how to perform the tasks associated with FIG. 3 in a different order than represented or to perform one or more of the tasks concurrently. Furthermore, it will be clear to those skilled in the art, after reading this disclosure, how to make and use alternative embodiments of the present invention that omit one or more of the tasks.

At task 310, user 101 identifies terminal 110 to server 130. The identification is used by server 130 to track the location of terminal 110. In accordance with the illustrative embodiment, user 101 submits the terminal's International Mobile Equipment Identity (IMEI) number. However, it will be clear to those skilled in the art, after reading this disclosure, how to make and use alternative embodiments of the present invention in which user 101 submits any information that can be used by server 130 to identify terminal 110, such as, for example, and without limitation, serial number, MAC address, telephone number associated with the terminal, etc. Furthermore, in accordance with the illustrative embodiment, the identification of terminal 110 is entered manually by user 101 (i.e. by typing the IMEI number into a web form), but it will be clear to those skilled in the art, after reading this disclosure, how to make and use alternative embodiments of the present invention in which the submission if the terminal's identity is accomplished automatically (e.g. by calling server 130 from telecommunications terminal 110 and automatically recording an identification of the call source at server 130, contacting the service provider for terminal 110 and requesting the identification information from the service provider, etc.)

At task 320, user 101 submits to server 130 an electronic indication of a route along which the user intends to travel. In accordance with the illustrative embodiment, user 101 submits a computer file identifying a plurality of waypoints, but it will be clear to those skilled in the art, after reading this disclosure, how to make and use alternative embodiments of the present invention in which any type of electronic indication of a traveling route or a map is submitted, such as, for example, and without limitation, a Global Positioning System Exchange (GPX) file, geography markup language (GML) file, Open Street Map file, Garmin Mapcourse file, Google Earth Keyhole markup language file, and others.

At task 330, user 101 submits alternative contact information to server 130. In accordance with the illustrative embodiment of the present invention, the alternative contact information comprises the identity of a traveling companion of the user and an identification of a telecommunications terminal associated with the traveling companion (e.g. cell phone carried by the traveling companion). However, those skilled in the art will recognize, after reading this disclosure, how to make and use alternative embodiments of the present invention in which the alternative contact information comprises the contact information of an emergency contact who is not accompanying the user.

Figure 4:
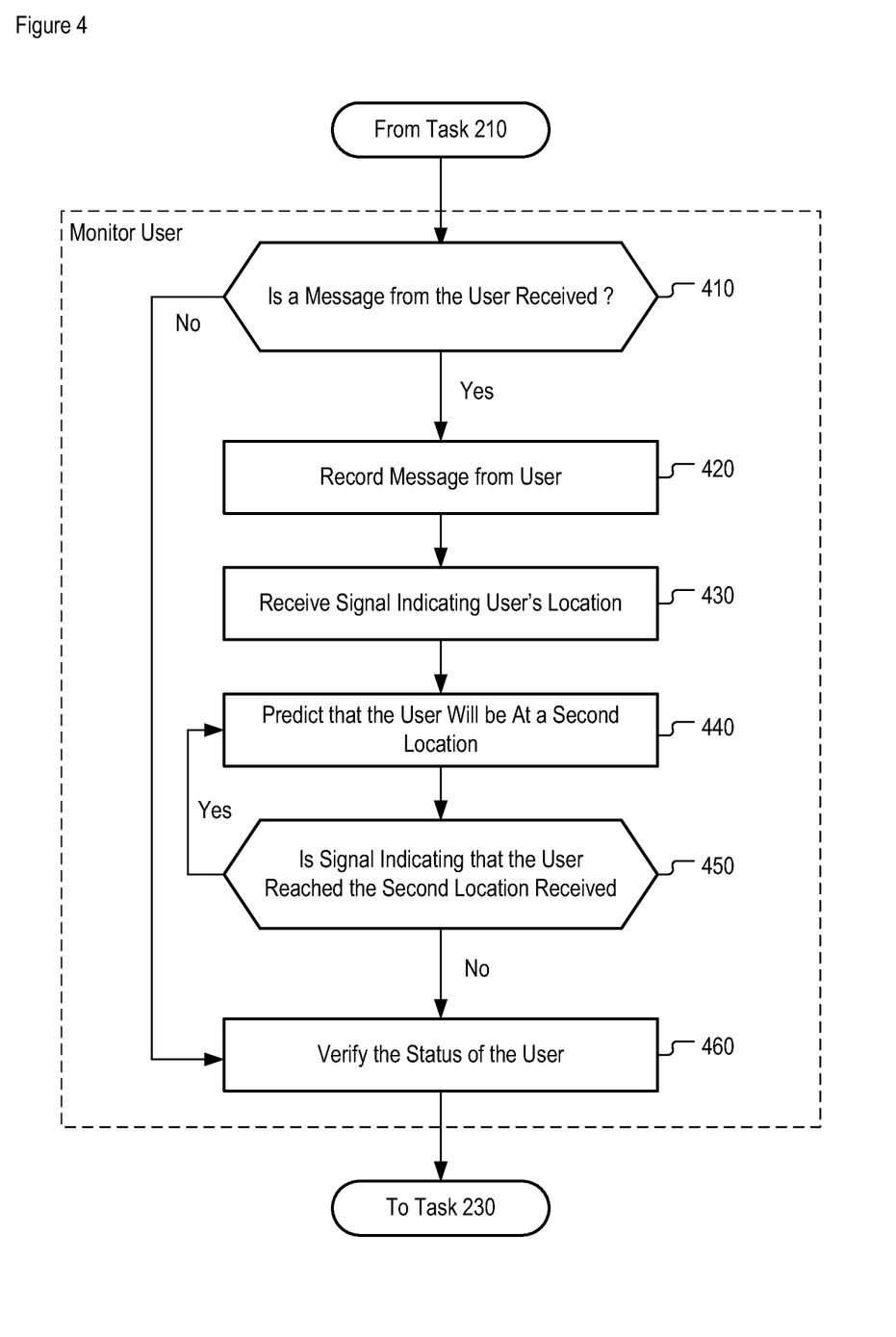
FIG. 4 depicts a flowchart of the salient subtasks associated with the execution of task 220.

FIG. 4 depicts a flowchart of the salient subtasks associated with the execution of task 220. It will be clear to those skilled in the art, after reading this disclosure, how to perform the tasks associated with FIG. 4 in a different order than represented or to perform one or more of the tasks concurrently. Furthermore, it will be clear to those skilled in the art, after reading this disclosure, how to make and use alternative embodiments of the present invention that omit one or more of the tasks.

At task 410, server 130 determines whether an expected message from user 101 has been received within a predetermined time period. In accordance with the illustrative embodiment of the present invention, the predetermined time period is one hour, but it will be clear to those skilled in the art that the time period can be of any length (e.g. 30 minutes, 2 hours, 3 hours, 1 day, etc.). In accordance with the illustrative embodiment of the present invention, the expected message is a voice message, but it will be clear to those skilled in the art, after reading this disclosure, how to make and use alternative embodiments of the present invention in which the expected message is any type of message, such as, for example, and without limitation, picture message, Short Message Service (SMS) message, email, instant messenger message, an indication of location, an indication that the user is in proximity to a scanning device, a beacon signal, etc. In accordance with the illustrative embodiment, the expected message is supposed to be transmitted by terminal 110, but it will be clear to those skilled in the art, after reading this disclosure, how to make and use alternative embodiments of the present invention in which the expected message is transmitted by another device, such as, for example, and without limitation, a stationary Radio Frequency Identification (RFID) scanner situated along the travel path of user 101, another telecommunications terminal associated with the user, telecommunications terminal associated with the user's traveling companion, and so forth. And still furthermore, it will be clear to those skilled in the art, after reading this disclosure, how to make and use alternative embodiments of the present invention in which the expected message indicates information that is pertinent to the safety of the user, such as, for example, and without limitation, the coordinates of the geographic location of the user, bodily temperature of the user, heart rate of the user, and so forth. Upon determining that the expected message from user 101 has been received, server 130 executes task 420. Otherwise, server 130 proceeds to execute task 460.

At task 420, server 130 records, in a well-known fashion, the message received at task 410.

At task 430, server 130 receives a signal indicating the location of terminal 110. In accordance with the illustrative embodiment, server 130 receives geo-locational information from terminal 110, but it will be clear to those skilled in the art, after reading this disclosure, how to make and use alternative embodiments of the present invention in which the geo-locational information is received from another device associated with user 101, such as, for example, and without limitation, a Global Positioning System (GPS) transceiver, another type of tracking device, personal computer, etc. Furthermore, it will be clear to those skilled in the art, after reading this disclosure, how to make and use alternative embodiments of the present invention in which server 130 determines the location of terminal 110 through cellular tower triangulation or another similar technique.

At task 440, server 130 predicts the next location at which terminal user 101 is expected to be in a predetermined period of time. In accordance with the illustrative embodiment, the predetermined period of time is five minutes, but it will be clear to those skilled in the art, after reading this disclosure, how to make and use alternative embodiments of the present invention in which the predetermined period is of any length (e.g. 1 minute, 2 minute, 10 minute, 1 hour, 3 hours, etc.). In accordance with the illustrative embodiment of the present invention, the predicted location is determined based on the traveling route information submitted at task 320. However, those skilled in the art will recognize, after reading this disclosure, how to make and use alternative embodiments of the present invention in which server 130 predicts the next location at which user 130 is expected to arrive on the basis of the location of one or more waypoints already reached by user 101 (e.g. present location of user, previous locations, etc.).

At task 450, server 130 determines whether user 101 reached the predicted location within the predetermined time period. In accordance with the illustrative embodiment, the determination is based on geo-locational information received from telecommunications terminal 110. However, it will be clear to those skilled in the art, after reading this disclosure, how to make and use alternative embodiments of the present invention in the determination of whether user 101 has reached the predicted location based on alternative means, such as, for example, and without limitation, geo-locational information received from a secondary tracking device associated with user 101 (e.g. Global Positioning System (GPS) transceiver, etc.), cellular tower triangulation, etc. If user 101 has reached the predicted location, server 130 executes task 430 again (i.e. the server predicts the next location at which the user is going to be in a predetermined period of time). If the user has not reached the predicted location, server 130 executes task 460.

At task 460, server 130 verifies the status of the user to ascertain that user 101 is safe. Task 460 is described in further detail in the discussion with respect to FIG. 5.

Figure 5:
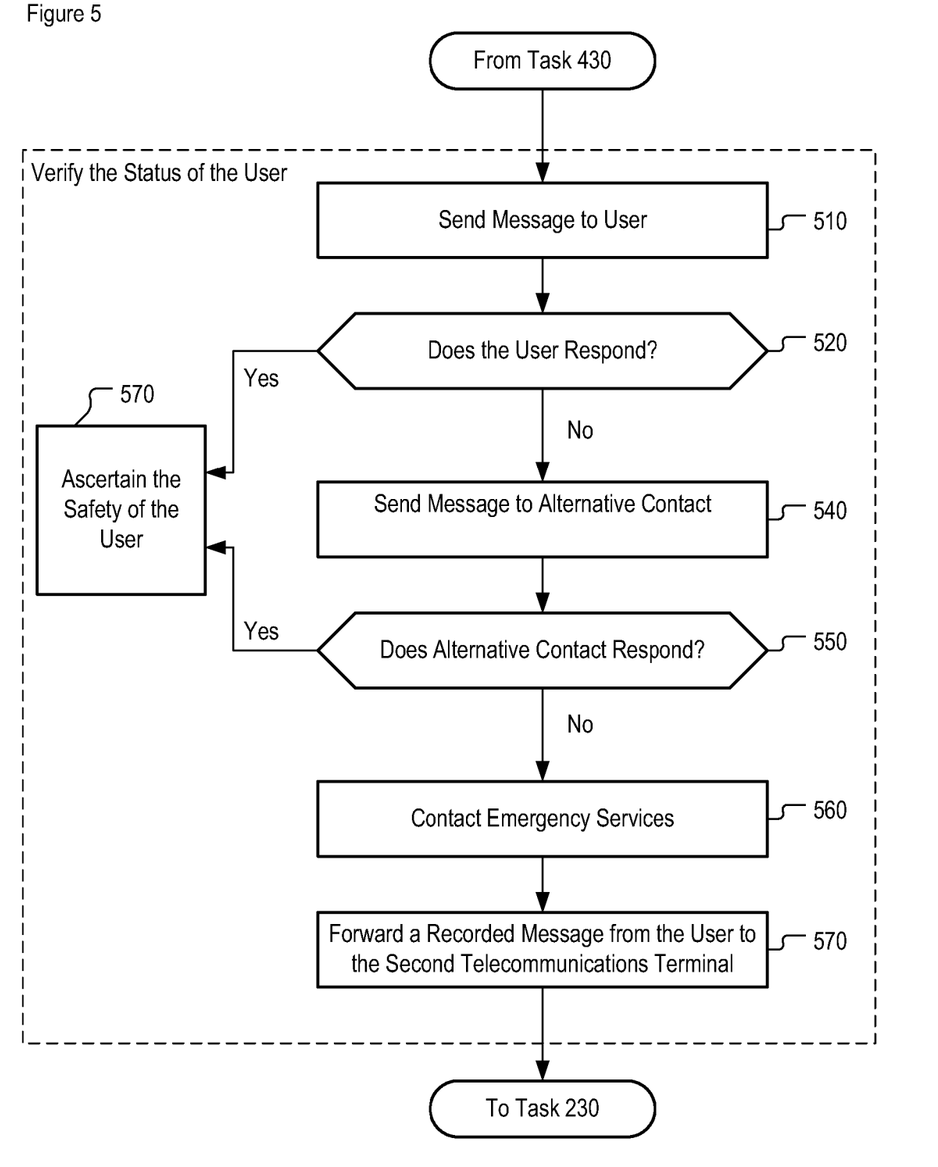
FIG. 5 depicts a flowchart of the salient subtasks associated with the execution of task 450.

FIG. 5 depicts a flowchart of the salient subtasks associated with the execution of task 460. It will be clear to those skilled in the art, after reading this disclosure, how to perform the tasks associated with FIG. 5 in a different order than represented or to perform one or more of the tasks concurrently. Furthermore, it will be clear to those skilled in the art, after reading this disclosure, how to make and use alternative embodiments of the present invention that omit one or more of the tasks.

At task 510, server 130 sends a message to user 101. In accordance with the illustrative embodiment of the present invention, the message sent is a request to initiate a telecommunications session with terminal 110. However, it will be clear to those skilled in the art, after reading this disclosure, how to make and use alternative embodiments of the present invention in which server 130 sends any type of telecommunications message (e.g. email, Short Message Service (SMS), etc.). Furthermore, it will be clear to those skilled in the art, after reading this disclosure, how to make and use alternative embodiments of the present invention in which server 130 prompts user 101 to submit a response to a query based on which server 130 determines whether user 101 is safe. For example, server 130 may transmit a Short Message Service (SMS) message: "Are you OK?," leave a voice mail message asking if user 101 is safe, etc.

At task 520, server 130 determines whether user 101 responds to the message sent at task 510. In accordance with the illustrative embodiment, server 130 determines if user 101 answers the telecommunications session request transmitted at task 510. However, those skilled in the art will recognize, after reading this disclosure, that alternative embodiments of the present invention can be devised in which user 101 responds via an alternative mode of communication, such as, for example, and without limitation, by sending an email or Short Message Service (SMS) response. Upon determining that user 101 has responded to the telecommunications session request sent at task 510, server 130 executes task 570. Otherwise, server 130 proceeds to execute task 530.

At task 570, server 130 ascertains that user 101 is safe. In accordance with the illustrative embodiment, server 130 connects user 101 to a live operator who communicates with user 101 to assure the user's safety. However, it will be clear to those skilled in the art, after reading this disclosure, how to make and use alternative embodiments of the present invention in which server 130 automatically transmits messages to user 101 and automatically processes the responses of user 101 by using information processing techniques, such as, for example, and without limitation, voice recognition, semantic text recognition, image recognition, etc.

At task 530, server 130 sends a message to the alternative contact for user 101. In accordance with the illustrative embodiment, the message sent is a request to initiate a telecommunications session with the cellular telephone of the traveling companion of user 101. However, it will be clear to those skilled in the art, after reading this disclosure, how to make and use alternative embodiments of the present invention in which server 130 sends any other type of telecommunications message (e.g. email, Short Message Service (SMS), etc.). Furthermore, it will be clear to those skilled in the art, after reading this disclosure, how to make and use alternative embodiments of the present invention in which server 130 prompts user 101's traveling companion to submit a response to a query based on which server 130 determines whether user 101 is safe. For example, and without limitation, server 130 may transmit a Short Message Service (SMS) message: "Is user 101 OK?," leave a voice mail message asking the traveling companion if user 101 is safe, etc.

At task 540, server 130 determines whether user 101's traveling companion responds to the message sent at task 530. In accordance with the illustrative embodiment, server 130 determines if the traveling companion answers the call initiated at task 530. However, those skilled in the art will recognize, after reading this disclosure, that alternative embodiments of the present invention can be devised in which user 101's travelling companion responds via an alternative mode of telecommunication, such as, for example, and without limitation, by sending an email or Short Message Service (SMS) message. Upon determining that the traveling companion of user 101 has responded to the message sent at task 530, server 130 executes task 570. Otherwise, server 130 proceeds to execute task 550.

At task 550, server 130 in well known fashion contacts the local emergency response team and alerts it that user 101 may be in danger.

At task 560, server 130 forwards one or more recorded messages of user 101 to the local emergency response team. It will be clear to those skilled in the art, after reading this disclosure, how to make and use alternative embodiments of the present invention in which server 130 provides the emergency response team with any information that is present in the profile for user 101. Furthermore, it will be clear to those skilled in the art, after reading this disclosure, how to make and use alternative embodiments of the present invention in which in which server 130 provides the emergency response team with any information that has been attained during the monitoring of the safety of user 101, such as, for example, and without limitation, a schedule of different locations (waypoints) visited by the user, a schedule of times at which the user was at the waypoints, speed of movement of the user, record of the user's bodily temperature, record of the user's heart rate, and so forth.

Figure 6:
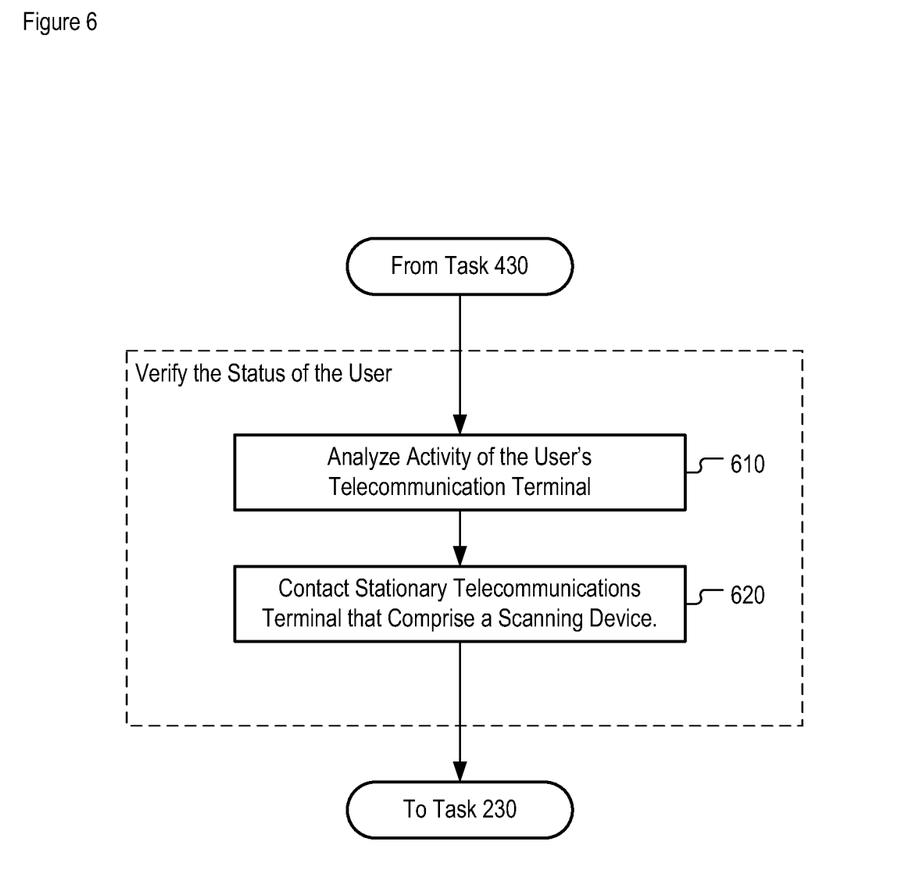
FIG. 6 depicts a flowchart of the salient subtasks associated with the execution of task 450 as performed by another illustrative embodiment of the present invention.

FIG. 6 depicts a flowchart of the salient subtasks associated with the execution of task 460 as performed by another illustrative embodiment of the present invention. It will be clear to those skilled in the art, after reading this disclosure, how to perform the tasks associated with FIG. 6 in a different order than represented or to perform one or more of the tasks concurrently. Furthermore, it will be clear to those skilled in the art, after reading this disclosure, how to make and use alternative embodiments of the present invention that omit one or more of the tasks.

At task 610, server 130 obtains and processes information about the activity of terminal 110 in order to rule out the possibility that user 101 is in danger. In accordance with the illustrative embodiment, the activity information for terminal 110 comprises any information that concerns the state or actions taken by terminal 110, such as, for example, and without limitation, information about telecommunications sessions initiated by the terminal (e.g. time, duration, far-end party identity, etc.), whether the terminal is currently involved in the conduct of a telecommunications session, any information exchanged between terminal 110 and its telecommunications service provider, information about the connections of terminal 110 to base stations (e.g. location, times, duration of connections, etc.), and so forth. Server 130 processes and analyzes the activity information in order to verify the existence of activity patterns that indicate that user 101 is in danger. In accordance with the illustrative embodiment of the present invention, patterns of activity of terminal 110 that indicate that user 101 is in danger comprise the dialing of 911, an attempt by user 101 to connect to his or her emergency contact, the calling of many telephone numbers within a very short period of time, and others. It should be noted that the present invention is not limited to any particular set of activity patterns that indicate that user 101 is in danger. It will be clear to those skilled in the art how to correlate patterns in the activity of terminal 110 with the safety status of user 101.

At task 620, server 130 contacts a stationary telecommunications device that is capable of confirming that user 101 was present at the device's location at a particular time instant. In accordance with the illustrative embodiment, the stationary telecommunications device comprises a radio frequency identification (RFID) reader that is capable of scanning a radio frequency identification (RFID) tag carried by the user, but it will be clear to those skilled in the art, after reading this disclosure, how to make and use alternative embodiments of the present invention in which alternative scanning technologies are used, such as for example, and without limitation, bar code readers, magnetic readers, etc. In accordance with the illustrative embodiment, server 130 uses the information from the stationary telecommunications device to determine whether user 101 is still moving. For example, and without limitation, if one or more stationary telecommunications devices confirm that the user was present at their location, this information indicates that the user is still moving and he is not severely injured.

It is to be understood that the disclosure teaches just examples of the illustrative embodiments and that many variations of the invention can easily be devised by those skilled in the art after reading this disclosure and that the scope of the present invention is to be determined by the following claims.

What is claimed is:

1. A method comprising:
   receiving a signal $s_1$ at time $t_1$ from a first telecommunications terminal that is at a first location;
   predicting that the first telecommunications terminal will be at a second location at time $t_2$;
   when the signal $s_1$ is received at time $t_2$ from the second location, predicting that the first telecommunications terminal will be at a third location at time $t_3$; and
   when the signal $s_1$ is not received at time $t_2$ from a second location, verifying a status of a user of the first telecommunications terminal.

2. The method of claim 1 wherein the status of the user is verified by initiating a telecommunications session with the first telecommunications terminal.

3. The method of claim 1 wherein the status of the user is verified by initiating a telecommunications session with a second telecommunications terminal.

4. The method of claim 1 comprising transmitting a recorded message from the user to a second telecommunications terminal when the signal $s_1$ is not received at time $t_2$.

5. The method of claim 1 wherein:
   a telecommunications session is initiated with a second telecommunications terminal when the signal $s_1$ is not received at time $t_2$; and
   if the second telecommunications terminal fails to respond;
   a telecommunications session with a third terminal is initiated.

6. The method of claim 1 wherein verifying the status of the user comprises detecting present activity by the first telecommunications terminal.

7. The method of claim 1 wherein verifying the status of the user comprises receiving a message from a stationary telecommunications terminal associated with a known location indicating that the user has been present at the known location.

8. The method of claim 1 wherein the status of the user is verified only if a message is not received from the user at time $t_2$.

9. A method comprising:
   receiving a signal indicating information about a traveling route of a user and an identification of a first telecommunications terminal associated with the user;
   predicting that the first telecommunications terminal will be at a second location at time $t_1$ based on the information about the traveling route of the user;
   when the signal $s_1$ is received at time $t_2$ from the second location, predicting that the first telecommunications terminal will be at a third location at time $t_3$; and
   when the signal $s_1$ is not received at time $t_2$ from a second location, verifying a status of a user of the first telecommunications terminal.

10. The method of claim 9 wherein the status of the user is verified by initiating a telecommunications session with the first telecommunications terminal.

11. The method of claim 9 wherein the status of the user is verified by initiating a telecommunications session with a second telecommunications terminal.

12. The method of claim 9 comprising:
    transmitting a recorded message from the user to a second telecommunications terminal when the signal $s_1$ is not received at time $t_2$.

13. The method of claim 9 wherein:
    a telecommunications session is initiated with a second telecommunications terminal when the signal $s_1$ is not received at time $t_2$; and
    if the second telecommunications terminal fails to respond;
    a telecommunications session with a third terminal is initiated.

14. The method of claim 9 wherein verifying the status of the user comprises detecting present activity by the first telecommunications terminal.

15. A method comprising:
    receiving a signal $s_1$ at time $t_1$ from a first telecommunications terminal that is at a first location;
    predicting that the first telecommunications terminal will be at a second location at time $t_2$;
    when a message from the user is received between time $t_1$ and $t_2$, predicting that the first telecommunications terminal will be at a third location at time $t_3$; and
    when a message from the user is not received between time $t_1$ and $t_2$, verifying a status of a user of the first telecommunications terminal.

16. The method of claim 15 wherein the status of the user is verified by calling the first telecommunications terminal.

17. The method of claim 15 wherein the status of the user is verified by calling a second telecommunications terminal associated with the user.

18. The method of claim 15 comprising transmitting a recorded message from the user to a second telecommunications terminal when the signal $s_1$ is not received at time $t_2$.

19. The method of claim 15 wherein:
    a telecommunications session is initiated with a second telecommunications terminal when the signal $s_1$ is not received at time $t_2$; and
    if the second telecommunications terminal fails to respond;
    a telecommunications session with a third terminal is initiated.

20. The method of claim 15 wherein verifying the status of the user comprises detecting present activity by the first telecommunications terminal.

21. The method of claim 15 wherein verifying the status of the user comprises receiving a message from a stationary telecommunications terminal associated with a known location indicating that the user has been present at the known location.

22. The method of claim 15 wherein the status of the user is verified only if the signal $s_1$ is not received at time $t_2$ from the second location.

* * * * *